US012620159B2

(12) United States Patent
Opdenbosch

(10) Patent No.: US 12,620,159 B2
(45) Date of Patent: May 5, 2026

(54) TRACKING MODIFIED GROUND COVERAGE AT A SITE

(71) Applicant: Trimble Inc., Westminster, CO (US)

(72) Inventor: Augusto Opdenbosch, Alpharetta, GA (US)

(73) Assignee: Trimble Inc., Westminster, CO (US)

( * ) Notice: Subject to any disclaimer, the term of this patent is extended or adjusted under 35 U.S.C. 154(b) by 227 days.

(21) Appl. No.: 18/084,424

(22) Filed: Dec. 19, 2022

(65) Prior Publication Data

US 2024/0203024 A1 Jun. 20, 2024

(51) Int. Cl.
*G06T 15/00* (2011.01)
*A01B 79/00* (2006.01)

(52) U.S. Cl.
CPC .......... *G06T 15/005* (2013.01); *A01B 79/005* (2013.01)

(58) Field of Classification Search
CPC .... A01B 76/00; A01B 79/005; A01M 7/0089; G06T 15/005
See application file for complete search history.

(56) References Cited

U.S. PATENT DOCUMENTS

| | | | | |
|---|---|---|---|---|
| 10,754,342 | B2 * | 8/2020 | Tomita | G05D 1/027 |
| 2008/0170079 | A1 * | 7/2008 | Ramshaw | G06T 15/005 345/501 |
| 2017/0060134 | A1 * | 3/2017 | Buhler | A01B 69/008 |

| | | | | |
|---|---|---|---|---|
| 2019/0318550 | A1 * | 10/2019 | Lakshamanan | G01C 21/3492 |
| 2019/0354174 | A1 * | 11/2019 | Young | G06F 3/011 |
| 2021/0015039 | A1 | 1/2021 | Vandike et al. | |
| 2021/0034867 | A1 | 2/2021 | Ferrari et al. | |
| 2021/0089027 | A1 | 3/2021 | Dasika | |
| 2021/0119848 | A1 * | 4/2021 | Ibars Casas | H03M 13/1105 |
| 2021/0123728 | A1 | 4/2021 | Smith | |
| 2022/0124956 | A1 * | 4/2022 | Lorentzen | G06T 7/90 |
| 2022/0317702 | A1 * | 10/2022 | Chowdhary | A01C 21/00 |
| 2023/0270038 | A1 * | 8/2023 | Vandike | A01D 41/141 56/10.2 A |
| 2024/0005526 | A1 * | 1/2024 | Olkhovik | G06T 15/005 |

OTHER PUBLICATIONS

Extended European Search Report for Application No. 23215182.9-1105 / 4388843, mailed May 29, 2024, 7 pages.

* cited by examiner

*Primary Examiner* — Matthew J. Reda

(74) *Attorney, Agent, or Firm* — Kilpatrick Townsend & Stockton LLP

(57) ABSTRACT

Described herein are systems, methods, and other techniques for generating a ground coverage map that indicates portions of a site that have been modified by a vehicle operating within the site. First and second modifier data regarding an operation of a site modifier device of the vehicle at first and second times are captured using a site modifier sensor attached to the vehicle. First and second coverage regions are predicted based on the first and second modifier data, the first and second coverage regions corresponding to regions within the site that are modified by the site modifier device at the first and second times. First and second coverage images are computed based on the first and second coverage regions. The first and second coverage images are accumulated to generate the ground coverage map.

17 Claims, 9 Drawing Sheets

Capture first and second modifier data using site
modifier sensor attached to vehicle
702

Predict first and second coverage regions based on
first and second modifier data
704

Computing first and second coverage images based
on first and second coverage regions
706

Accumulate first and second coverage images to
generate ground coverage map
708

700

TRACKING MODIFIED GROUND COVERAGE AT A SITE

BACKGROUND OF THE INVENTION

Modern mobile machinery, including construction and agricultural machines, have dramatically increased the efficiency of performing various work-related tasks. For example, earthmoving machines employing automatic grade control systems are able to grade project areas using fewer passes than what was previously done manually. As another example, modern asphalt pavers and other road makers have allowed replacement of old roads and construction of new roads to occur on the order of hours and days instead of what once took place over weeks and months. Due to the automation of various aspects, construction and agriculture projects can be carried out by crews with fewer individuals than what was previously required. Much of the technological advances of mobile machinery are owed in part to the availability of accurate sensors that allow real-time monitoring of the condition and position of a machine's components and/or the environment surrounding the machine.

In some instances, modern mobile agricultural machines have dramatically increased the efficiency of harvesting a variety of grain crops, including wheat, corn, oats, rye, barley, among others. Such machines may be guided in part by various cameras and sensors mounted to the machines, such as one or more global navigation satellite systems (GNSS) receivers which use wireless signals transmitted from medium Earth orbit (MEO) satellites to generate position estimates of the machines. The emergence of self-driving harvesting combines along with other row-guided farm vehicles has reduced the amount of row overlap, which has translated into reduced fuel costs and less wear to the vehicles.

Despite the improvements to modern mobile machinery, new systems, methods, and techniques are still needed.

BRIEF SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of generating a ground coverage map that indicates portions of a site that have been modified by a vehicle operating within the site, the method comprising: capturing, using a site modifier sensor attached to the vehicle, first and second modifier data regarding an operation of a site modifier device of the vehicle at first and second times; predicting first and second coverage regions based on the first and second modifier data, respectively, the first and second coverage regions corresponding to regions within the site that are modified by the site modifier device at the first and second times, respectively; computing first and second coverage images based on the first and second coverage regions, respectively; and accumulating the first and second coverage images to generate the ground coverage map.

Example 2 is the method of example(s) 1, wherein the site modifier device is attached to an implement of the vehicle.

Example 3 is the method of example(s) 1-2, wherein the site modifier device is one of: a sprayer, a planter, a harvesting tool, or a soil compactor.

Example 4 is the method of example(s) 1-3, wherein predicting the first and second coverage regions includes: predicting two-dimensional (2D) or three-dimensional (3D) coordinates defining positions of the first and second coverage regions based on the first and second modifier data, respectively.

Example 5 is the method of example(s) 1-4, wherein predicting the first and second coverage regions includes: predicting one or more magnitude values defining an extent to which the site modifier device modified the site within the first and second coverage regions based on the first and second modifier data, respectively.

Example 6 is the method of example(s) 1-5, wherein the first and second coverage images are top-down images.

Example 7 is the method of example(s) 1-6, wherein the first and second coverage regions are predicted at a central processing unit (CPU), wherein the first and second coverage images are computed at a graphics processing unit (GPU), and wherein the first and second coverage images are accumulated to generate the ground coverage map at the GPU.

Example 8 is a system for generating a ground coverage map that indicates portions of a site that have been modified by a vehicle operating within the site, the system comprising: one or more processors; and a computer-readable medium comprising instructions that, when executed by the one or more processors, cause the one or more processors to perform operations comprising: capturing, using a site modifier sensor attached to the vehicle, first and second modifier data regarding an operation of a site modifier device of the vehicle at first and second times; predicting first and second coverage regions based on the first and second modifier data, respectively, the first and second coverage regions corresponding to regions within the site that are modified by the site modifier device at the first and second times, respectively; computing first and second coverage images based on the first and second coverage regions, respectively; and accumulating the first and second coverage images to generate the ground coverage map.

Example 9 is the system of example(s) 8, wherein the site modifier device is attached to an implement of the vehicle.

Example 10 is the system of example(s) 8-9, wherein the site modifier device is one of: a sprayer, a planter, a harvesting tool, or a soil compactor.

Example 11 is the system of example(s) 8-10, wherein predicting the first and second coverage regions includes: predicting two-dimensional (2D) or three-dimensional (3D) coordinates defining positions of the first and second coverage regions based on the first and second modifier data, respectively.

Example 12 is the system of example(s) 8-11, wherein predicting the first and second coverage regions includes: predicting one or more magnitude values defining an extent to which the site modifier device modified the site within the first and second coverage regions based on the first and second modifier data, respectively.

Example 13 is the system of example(s) 8-12, wherein the first and second coverage images are top-down images.

Example 14 is the system of example(s) 8-13, wherein the first and second coverage regions are predicted at a central processing unit (CPU), wherein the first and second coverage images are computed at a graphics processing unit (GPU), and wherein the first and second coverage images are accumulated to generate the ground coverage map at the GPU.

Example 15 is a non-transitory computer-readable medium comprising instructions that, when executed by one or more processors, cause the one or more processors to perform operations for generating a ground coverage map that indicates portions of a site that have been modified by a vehicle operating within the site, the operations comprising: receiving first and second modifier data regarding an operation of a site modifier device of the vehicle at first and second times, the first and second modifier data having been captured using a site modifier sensor attached to the vehicle; predicting first and second coverage regions based on the first and second modifier data, respectively, the first and second coverage regions corresponding to regions within the site that are modified by the site modifier device at the first and second times, respectively; computing first and second coverage images based on the first and second coverage regions, respectively; and accumulating the first and second coverage images to generate the ground coverage map.

Example 16 is the non-transitory computer-readable medium of example(s) 15, wherein the site modifier device is one of: a sprayer, a planter, a harvesting tool, or a soil compactor.

Example 17 is the non-transitory computer-readable medium of example(s) 15-16, wherein predicting the first and second coverage regions includes: predicting two-dimensional (2D) or three-dimensional (3D) coordinates defining positions of the first and second coverage regions based on the first and second modifier data, respectively.

Example 18 is the non-transitory computer-readable medium of example(s) 15-17, wherein predicting the first and second coverage regions includes: predicting one or more magnitude values defining an extent to which the site modifier device modified the site within the first and second coverage regions based on the first and second modifier data, respectively.

Example 19 is the non-transitory computer-readable medium of example(s) 15-18, wherein the first and second coverage images are top-down images.

Example 20 is the non-transitory computer-readable medium of example(s) 15-19, wherein the first and second coverage regions are predicted at a central processing unit (CPU) of the one or more processors, wherein the first and second coverage images are computed at a graphics processing unit (GPU) of the one or more processors, and wherein the first and second coverage images are accumulated to generate the ground coverage map at the GPU.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

Figure 1:
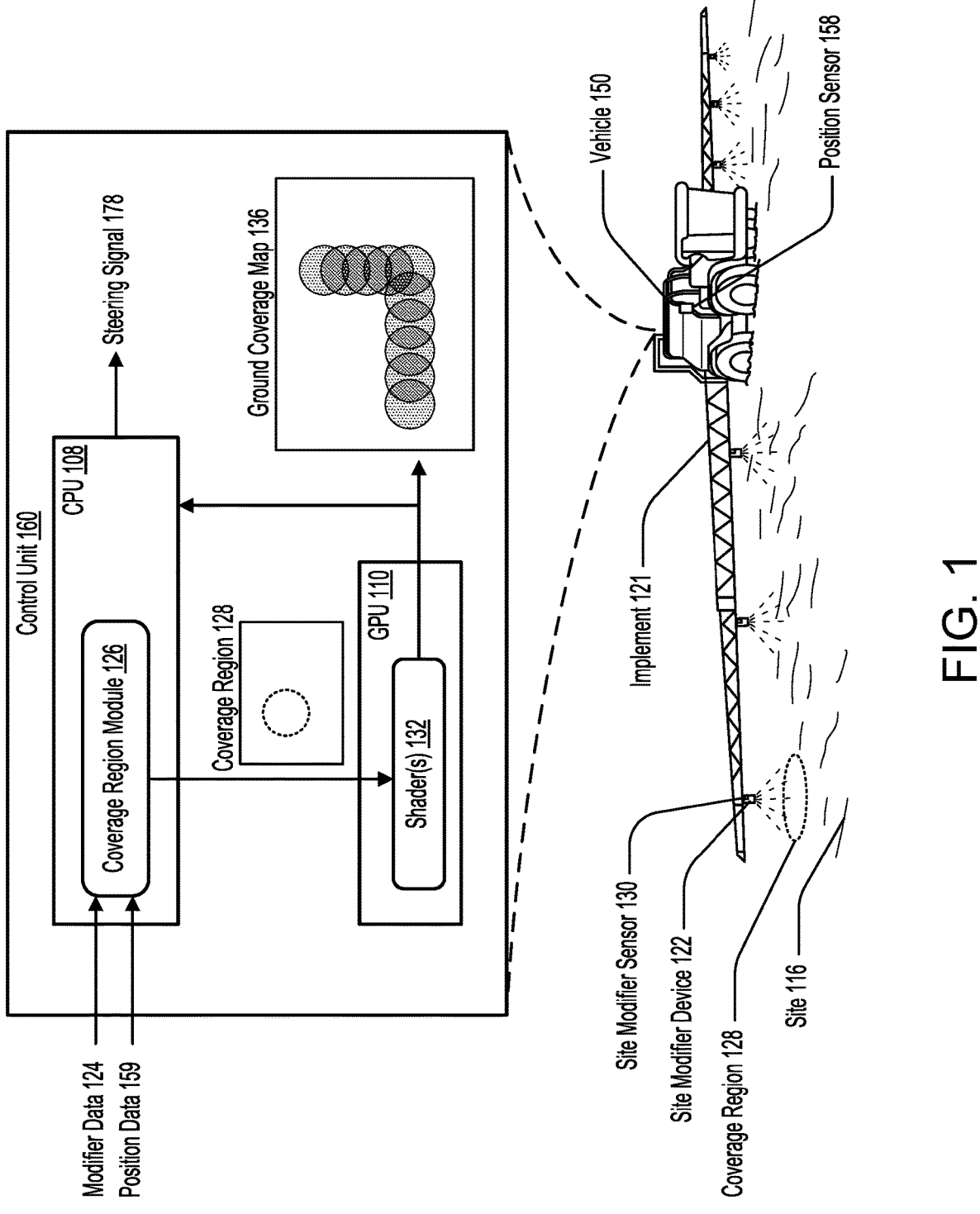
FIG. 1 illustrates an example of one or more techniques of the present disclosure being implemented within an agricultural environment.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label, irrespective of the suffix.

DETAILED DESCRIPTION OF THE INVENTION

Mobile machines deployed at a work site, such as an agricultural site, can be equipped with devices or tools that modify the site as the mobile machine traverses the site. In the present disclosure, such tools may be referred to as "site modifier devices", and may include, for example, (1) sprayers for irrigating the site or delivering fluids such as liquid fertilizers, herbicides, or insecticides to the site, (2) planters for planting seeds for crops to be grown at the site, (3) harvesting tools for extracting crops from the site, (4) compactors for compacting soil at the site using rolling or ramming equipment, among other possibilities. In various examples, site modifier devices may be mounted directly to the tractor of the mobile machine or to an implement coupled to the tractor.

In some embodiments, a mobile machine can include sensors that monitor the operation of site modifier devices so to predict regions at the site that are modified (e.g., physically affected in some manner) by the site modifier devices. In the present disclosure, such sensors may be referred to as "site modifier sensors", and may include one or more of: a flow meter that measures the rate or volume of a moving fluid at a sprayer, a sensor that records the spread setting associated with a sprayer, a sensor that measures the rate or quantity of seeds that are planted by a planter, a sensor that records the spread setting associated with a planter, a sensor that measures the rate or quantity of crops that are extracted by a harvesting tool, among other possibilities.

Data collected by a site modifier sensor may be referred to herein as "modifier data". Such data can be analyzed along with position data captured using position sensors to predict the coverage region for the site modifier device at different times. In some examples, predicting the coverage region may include predicting two-dimensional (2D) or three-dimensional (3D) coordinates defining the position(s) of the coverage region (e.g., its outline, outer edges, center, etc.) and/or magnitude values defining an extent to which the site modifier device modified particular positions within the coverage region. In some examples, the coverage region may include a single magnitude value defined for the entire coverage region. In some examples, the coverage region may include a first magnitude value defined for an inner region of the entire coverage region, a second magnitude value (less than the first) defined for a first outer region surrounding the inner region, and a third magnitude value (less than the second) defined for a second outer region surrounding the second region (for example, for a site modifier device such as a sprayer where the center of the coverage region is modified more than the outer regions due to their further distance from the sprayer).

The position sensor may be a satellite-based positioning sensor, such as a Global Navigation Satellite System (GNSS) receiver, that can be used to determine the position of the site modifier device and/or the region modified by the site modifier device. For example, the position sensor may be mounted to the tractor of the mobile machine or near the site modifier device. When mounted to the tractor, the position data captured by the position sensor may be used to compute a vehicle path including a direction vector of the mobile machine. The vehicle path can be used to translate the position of the mobile machine into the position of the site modifier device and/or the coverage region.

Embodiments described herein relate to systems, methods, and other techniques for generating ground coverage maps that indicate which portions of an agricultural site have been modified by site modifier devices of a mobile machine. Embodiments may include collecting data using sensors associated with the site modifier devices to predict a coverage region for each site modifier device at various time stamps. Each coverage region may be used to compute a coverage image as seen from a virtual camera positioned at a reference point above the site. The coverage images may be repeatedly accumulated in real time to generate the ground coverage map for the work-related task being performed by the mobile machine. The ground coverage map may be displayed at the mobile machine and/or may be used to steer the mobile machine during the work-related task.

Certain steps of the described embodiments may be performed by a set of graphics shaders that run in parallel in the graphics processing unit (GPU). The shaders may perform accumulation for every pixel in an image, and may store the accumulated pixels locally in the GPU during the entire accumulation process. The accumulation of multiple coverage images may produce a ground coverage map, which may be periodically rendered and sent to a display and/or be used by a control unit by the mobile machine.

Embodiments described herein are useful in a number of applications, but may be particularly useful for agricultural sprayers, which are mobile machinery that deploy long sprayer booms to deliver liquids at an agricultural site. The delivered liquids may contain water, fertilizer, plant food, herbicide, insecticide, among other possibilities, as well as various combinations thereof. Typically, the sprayer boom is attached to the tractor portion of the vehicle at a center portion along the boom, extending outward in either direction above the ground at a constant or near constant height. Given the length of the sprayer boom, which can be as long as 45 meters, it is beneficial to provide generation and visualization of the ground coverage map as the machine moves through the site.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the embodiments being described.

FIG. 1 illustrates an example of one or more techniques of the present disclosure being implemented within an agricultural environment. Specifically, FIG. 1 shows a vehicle 150 being deployed at a site 116 and having the control thereof at least partially implemented by a control unit 160 which, in various embodiments, may be communicatively coupled to a site modifier device 122, a site modifier sensor 130, and/or a position sensor 158. Site modifier device 122 may be a device that modifies a coverage region 128 of site 116 as vehicle 150 operates within site 116. As vehicle 150 moves and/or as site modifier device 122 changes its operation, coverage region 128 may also change. As such, coverage region 128 may be time dependent and may be determined at one or more times. In the illustrated example, site modifier device 122 is a sprayer that is mounted to an implement 121 of vehicle 150 and that delivers fluids to coverage region 128.

Site modifier sensor 130 may monitor the operation of site modifier device 122 so as to collect modifier data 124, which is data that is indicative of the operation of site modifier device 122. For example, site modifier sensor 130 may be positioned on or near site modifier device 122 and may, in some examples, monitor the manner in which site modifier device 122 is operating. For example, site modifier sensor 130 may include a camera mounted to site modifier device 122 or to implement 121 and oriented downward toward the ground of site 116 so as to capture images/video from which the position and magnitude of coverage region 128 can be visually captured. In another example, site modifier sensor 130 may include a flowmeter that measures the rate that liquid is flowing through site modifier device 122. In another example, site modifier sensor 130 may include a device that determines the intrinsic settings of site modifier device 122, such as its spread setting (e.g., the spread radius or spread diameter).

Position sensor 158 may be any suitable sensor that measures 2D or 3D positions within a reference frame. For example, position sensor 158 may include a GNSS receiver that receives satellite signals from a plurality of GNSS satellites and computes a position using the received satellite signals. Position sensor 158 may collect position data 159 that includes 2D or 3D positions of itself or any device to which it is mounted. When mounted to the tractor of vehicle 150, position sensor 158 may be configured to collect position data 159 that includes the position of the tractor of vehicle 150. When mounted to the site modifier device 122, position sensor 158 may be configured to collect position data 159 that includes the position of site modifier device 122.

In some examples, modifier data 124 and position data 159 are fed into a control unit 160 of vehicle 150 and are processed by a CPU 108 and a GPU 110 of control unit 160 to generate a ground coverage map 136. In some examples, CPU 108 may implement a coverage region module that predicts coverage region 128 based on modifier data 124 and position data 159. In some examples, the position of the coverage region 128 may be predicted using the 2D/3D position indicated in position data 159. For example, the 2D/3D position in position data 159 may correspond to the vehicle position and may be translated (e.g., using an offset vector) into the 2D/3D position(s) of coverage region 128. Modifier data 124 may also be used with position data 159 to predict the 2D/3D position(s) of coverage region 128. In the illustrated example, modifier data 124 may be used to predict the radius of coverage region 128 and position data 159 may be used to predict the center point of coverage region 128.

In some examples, coverage region module 126 may further be configured to predict magnitude values for coverage region 128. In some examples, the magnitude values may define an extent to which site modifier device 122 modifies particular positions within coverage region 128. In the illustrated example, the center region of coverage region 128 may have higher magnitude values than the outer regions of coverage region 128 as the sprayer of site modifier device 122 may be configured to deliver fluids at a higher concentration toward the center of coverage region 128 and at a lower concentration toward the outer regions.

In some examples, the data for coverage region 128 may be sent from CPU 108 to GPU 110, which produces a coverage image for each received coverage region 128. In some examples, GPU 110 may implement one or more shaders 132 that compute the coverage image for coverage region 128. The coverage image may be a top-down orthographic image of coverage region 128 as seen from a virtual camera position above site 116. The coverage image may be a single channel image (e.g., having dimensions M×N) or multi-channel image (e.g., having dimensions M×N×C where C>1) having a plurality of pixels each with a pixel value between a minimum pixel value (e.g., 0) and a maximum pixel value (e.g., 1 or 100).

Each coverage image that is computed is added and accumulated to produce ground coverage map 136. For example, at a first time, CPU 108 may predict a first coverage region 128 and GPU 110 may compute a first coverage image, which is then included in ground coverage map 136. At a second time, CPU 108 may predict a second coverage region 128 and GPU 110 may compute a second coverage image, which is then included in ground coverage map 136 by accumulating the second coverage image with the first coverage image. At a third time, CPU 108 may predict a third coverage region 128 and GPU 110 may compute a third coverage image, which is then included in ground coverage map 136 by accumulating the third coverage image with the first and second coverage images. Accumulating coverage images may include summing, averaging, interpolating, or otherwise mathematically combining corresponding pixel values from the coverage images. In some examples, GPU 110 may store ground coverage map 136 in a local memory of GPU 110 (e.g., a scratchpad memory or a cache memory of GPU 110) during subsequent updates to ground coverage map 136. As such, ground coverage map 136 may be generated/updated with multiple coverage images without sending ground coverage map 136 to CPU 108, avoiding costly CPU-to-GPU data exchanges.

Ground coverage map 136 may be displayed at a display of vehicle 150 or otherwise utilized by vehicle 150. In some examples, ground coverage map 136 may be used by control unit 160 to control vehicle 150. For example, CPU 108 may analyze ground coverage map 136 to generate a steering signal 178 to cause vehicle 150 to steer in a desired manner. This may include causing vehicle 150 to pass over portions of site 116 that have not been modified by site modifier device 122 or to pass over portions of site 116 that have not been sufficiently modified (e.g., portions of site 116 where magnitude/pixel values of ground coverage map 136 are less than a particular threshold indicated in a site plan).

It is to be understood that vehicle 150 may include one or more (e.g., a plurality of, a set of) site modifier devices 122, one or more site modifier sensors 130, and/or one or more position sensors 158. For example, while the illustrated example shows vehicle 150 having six site modifier devices 122, six site modifier sensors 130, and a single position sensor 158, in other examples any number of each device/sensor may be utilized.

While site 116 is generally described herein as corresponding to an agricultural site such as a field at which crops are planted for harvesting, the present disclosure is applicable to a wide variety of construction, maintenance, or agricultural projects in mobile machinery are used. Similarly, while vehicle 150 is generally described herein as corresponding to an agricultural sprayer, the various techniques described herein are applicable to a wide variety of agricultural machines, construction machines, or heavy equipment such as graders, excavators, bulldozers, backhoes, pavers (e.g., concrete, asphalt, slipform, vibratory, etc.), compactors, scrapers, loaders, material handlers, combine harvesters, and the like.

In some embodiments, vehicle 150 may include a tractor with wheels, axles, and a gasoline-, diesel-, electric-, or steam-powered engine for providing power and traction to vehicle 150 to drive along a desired path, often at a constant speed. Vehicle 150 may be a tracked vehicle that incorporates a continuous track of treads or track plates that are driven by the vehicle's wheels. An operator of vehicle 150 may provide inputs to control unit 160 using various input devices such as levers, switches, buttons, pedals, steering wheels, and touch screens, which can cause various actuators to move vehicle 150.

In some instances, vehicle 150 may include an implement 121, which may have an elongated body that extends horizontally from both sides of vehicle 150 at a constant or near constant height. For example, at an agricultural site, implement 121 may be the boom sprayer of vehicle 150 that delivers liquids over a wide area as vehicle 150 moves along a row. As another example, implement 121 may be the header of a combine harvester. In other examples, at a construction site, implement 121 may be the blade of a bulldozer, the bucket of an excavator, or the drum of a compactor. As another example, at a road construction site, implement 121 may be the screed of an asphalt paver.

It should be appreciated that, in some embodiments, implement 121 and vehicle 150 may be considered to be separate bodies that have a semi-rigid coupling between them. The coupling is semi-rigid in that the bodies can move relative to each other but they can also be fixed at a given orientation. Some examples of semi-rigid couplings used on mobile machinery include c-frames, angle c-frames, push arms, L-shaped push arms, and the like.

Figure 2:
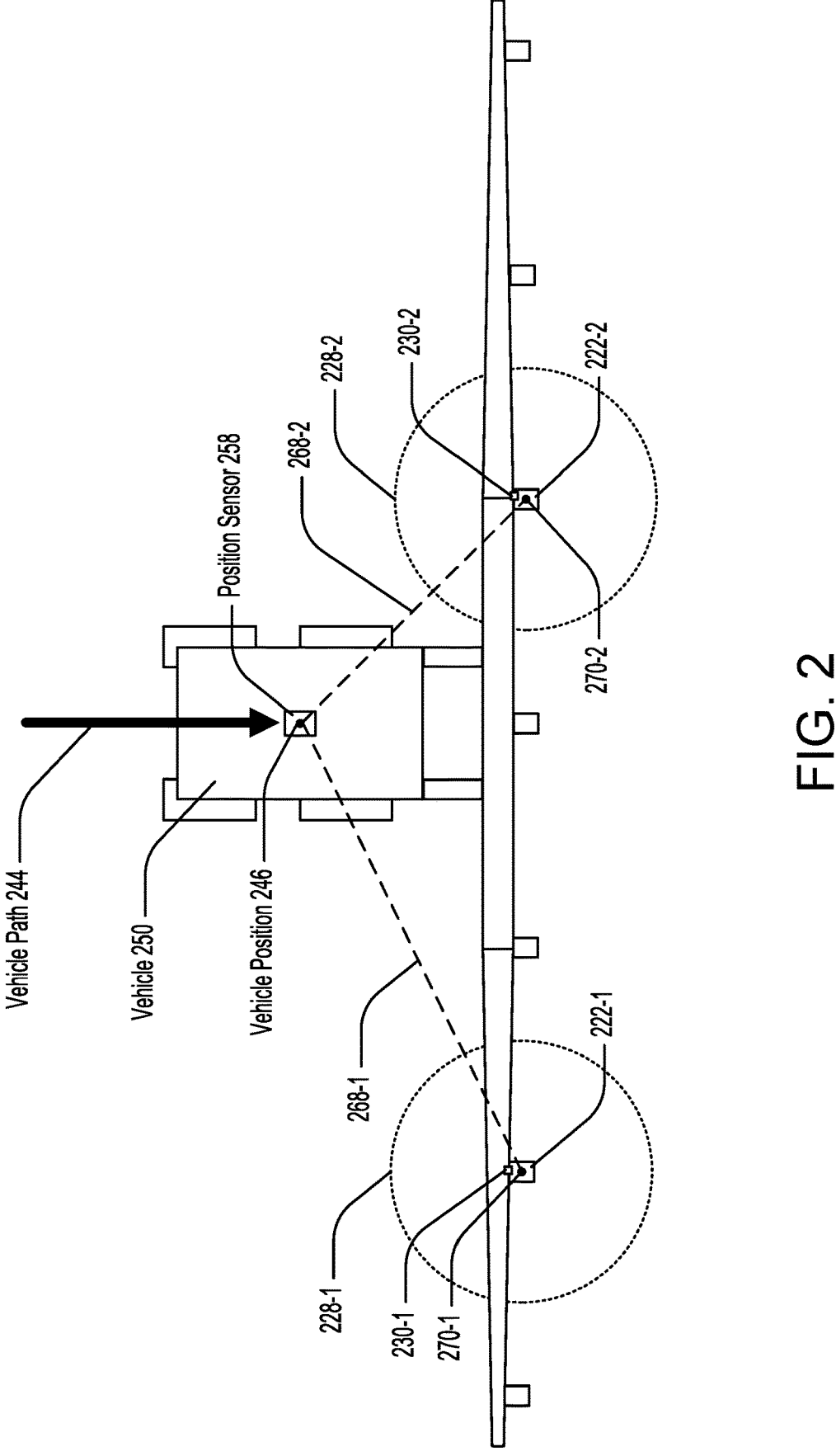
FIG. 2 illustrates an example prediction of coverage regions based on data captured at a vehicle.

FIG. 2 illustrates an example prediction of coverage regions 228 based on data captured at a vehicle 250, in accordance with some embodiments of the present disclosure. Vehicle 250 may include a position sensor 258 that captures position data indicative of a vehicle position 246. While the illustrated example shows a current position of vehicle position 246, previous vehicle positions 246 captured by position sensor 258 may be used to compute a vehicle path 244. In one example, vehicle path 244 may include the vector formed between the current vehicle position 246 and a previous vehicle position 246.

In the illustrated example, vehicle 250 includes site modifier devices 222 including a first site modifier device 222-1 and a second site modifier device 222-2 and site modifier sensors 230 including first site modifier sensor 230-1 and second site modifier sensor 230-2. To determine positions 270 of coverage regions 228, offset vectors 268 between vehicle positions 246 and positions 270 may be computed based on vehicle path 244. In some examples, offset vectors 268 may be predetermined based on the known geometry of vehicle 250. In the illustrated example, position 270-1 of coverage region 228-1 may be determined by translating vehicle position 246 into position 270-1 using offset vector 268-1, and position 270-2 of coverage region 228-2 may be determined by translating vehicle position 246 into position 270-2 using offset vector 268-2.

Next, to determine the positions of the entire shape of coverage regions 228, site modifier sensors 230 may capture modifier data that indicate the sizes and shapes (e.g., the radii) of coverage regions 228. In the illustrated example, site modifier sensor 230-1 may capture first modifier data indicating the size and shape of coverage region 228-1 that is centered at position 270-1 and site modifier sensor 230-2 may capture second modifier data indicating the size and shape of coverage region 228-2 that is centered at position 270-2. Furthermore, the first modifier data may be used to predict magnitude values for coverage region 228-1 and the second modifier data may be used to predict magnitude values for coverage region 228-2. The above steps may be repeated at each of multiple times for each site modifier device of vehicle 250 as vehicle 250 is operated within the site.

Figure 3:
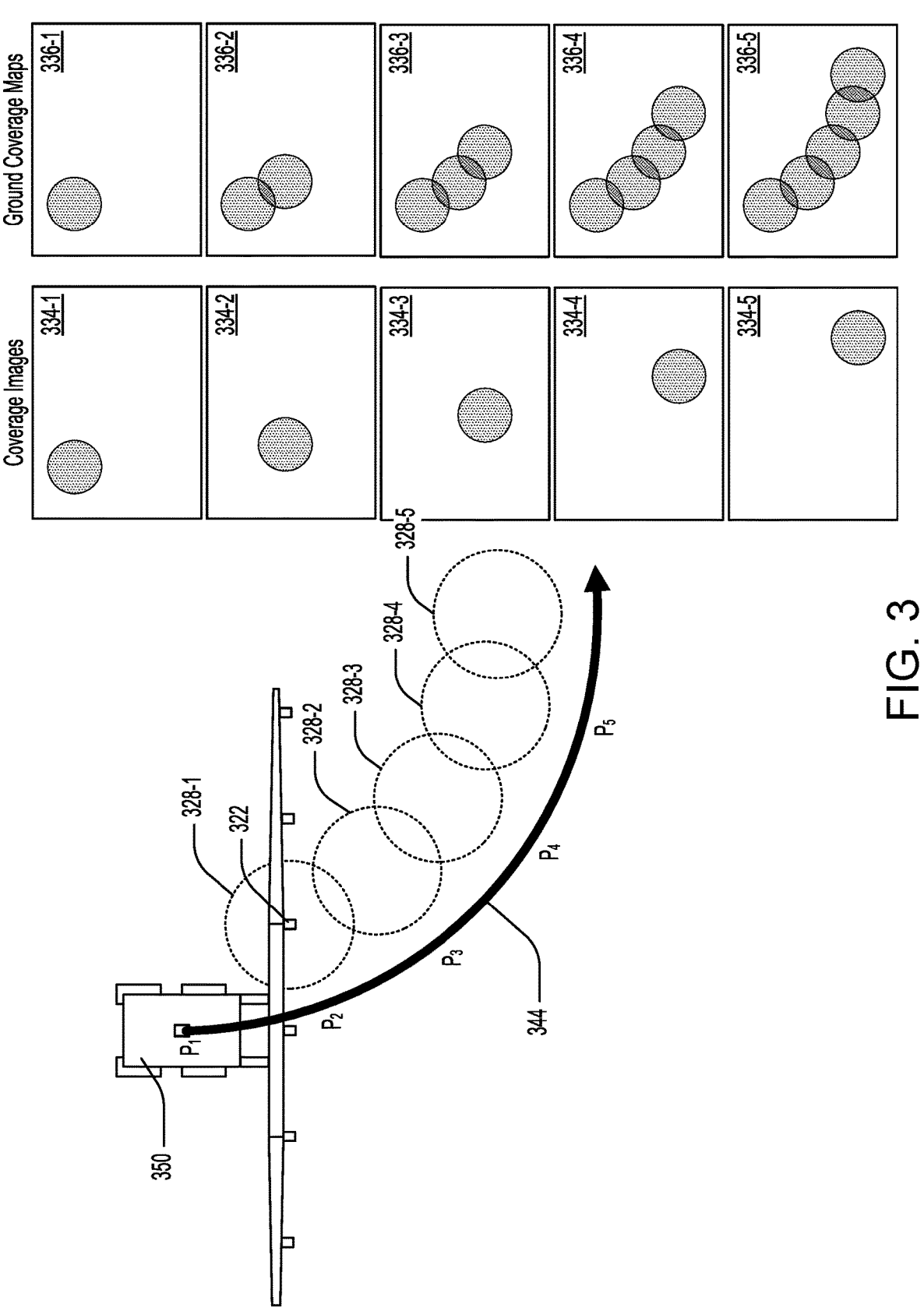
FIG. 3 illustrates an example of generating and updating a ground coverage map while a vehicle is operating within a site.

FIG. 3 illustrates an example of generating and updating a ground coverage map 336 while a vehicle 350 is operating within a site, in accordance with some embodiments of the present disclosure. In the illustrated example, while vehicle 350 is making a left turn, a set of positions $P_1, P_2, P_3, P_4$, and $P_5$ are computed using a position sensor and are used to compute a vehicle path 344. At position $P_1$, a first coverage region 328-1 is predicted for a site modifier device 322 based on position $P_1$ and the direction of vehicle path 344 at $P_1$ using an offset vector between $P_1$ and coverage region 328-1. A first coverage image 344-1 is computed based on coverage region 328-1 and ground coverage map 336-1 may optionally be initialized. At position $P_2$, a second coverage region 328-2 is predicted for site modifier device 322 based on position $P_2$ and the direction of vehicle path 344 at $P_2$ using an offset vector between $P_2$ and coverage region 328-2. A second coverage image 344-2 is computed based on coverage region 328-2 and ground coverage map 336 may be generated/updated by accumulating coverage images 334-1 and 334-2 to produce ground coverage map 336-2.

Similar steps are performed at each of positions $P_3, P_4$, and $P_5$. For example, at position $P_5$, a fifth coverage region 328-5 is predicted for site modifier device 322 based on position $P_5$ and the direction of vehicle path 344 at $P_5$ using an offset vector between $P_5$ and coverage region 328-5. A fifth coverage image 344-5 is computed based on coverage region 328-5 and ground coverage map 336 may be generated/updated by accumulating coverage images 334-1, 334-2, 334-3, 334-4, and 334-5 to produce ground coverage map 336-5. As shown in each of ground coverage maps 336-2, 336-3, 336-4, and 336-5, overlapping regions between two or more coverage images are darker to indicate combined pixel values from contributing coverage images.

Figure 4A:
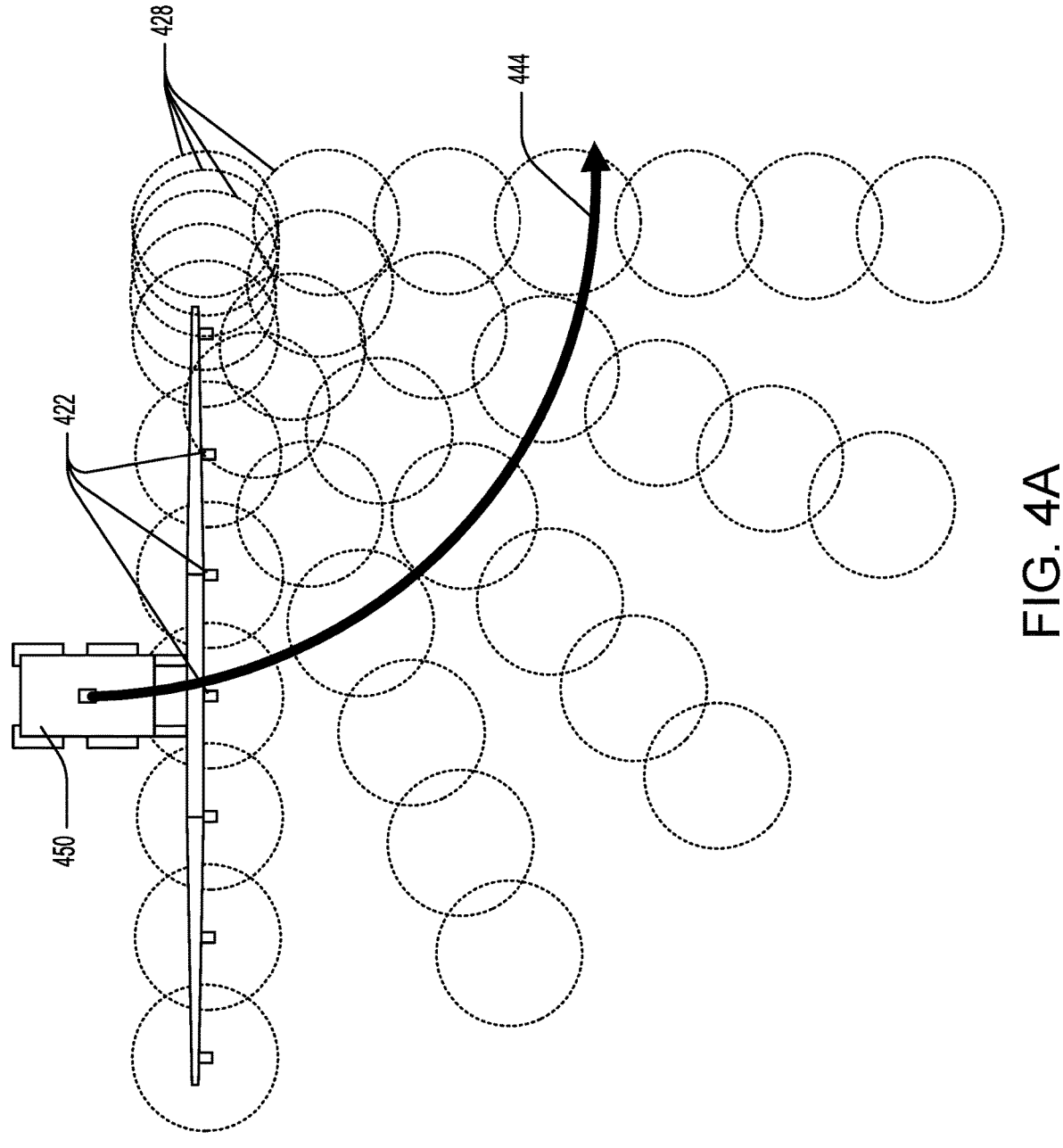
FIGS. 4A and 4B illustrate an example of generating a ground coverage map while a vehicle is operating within a site.
Figure 4B:
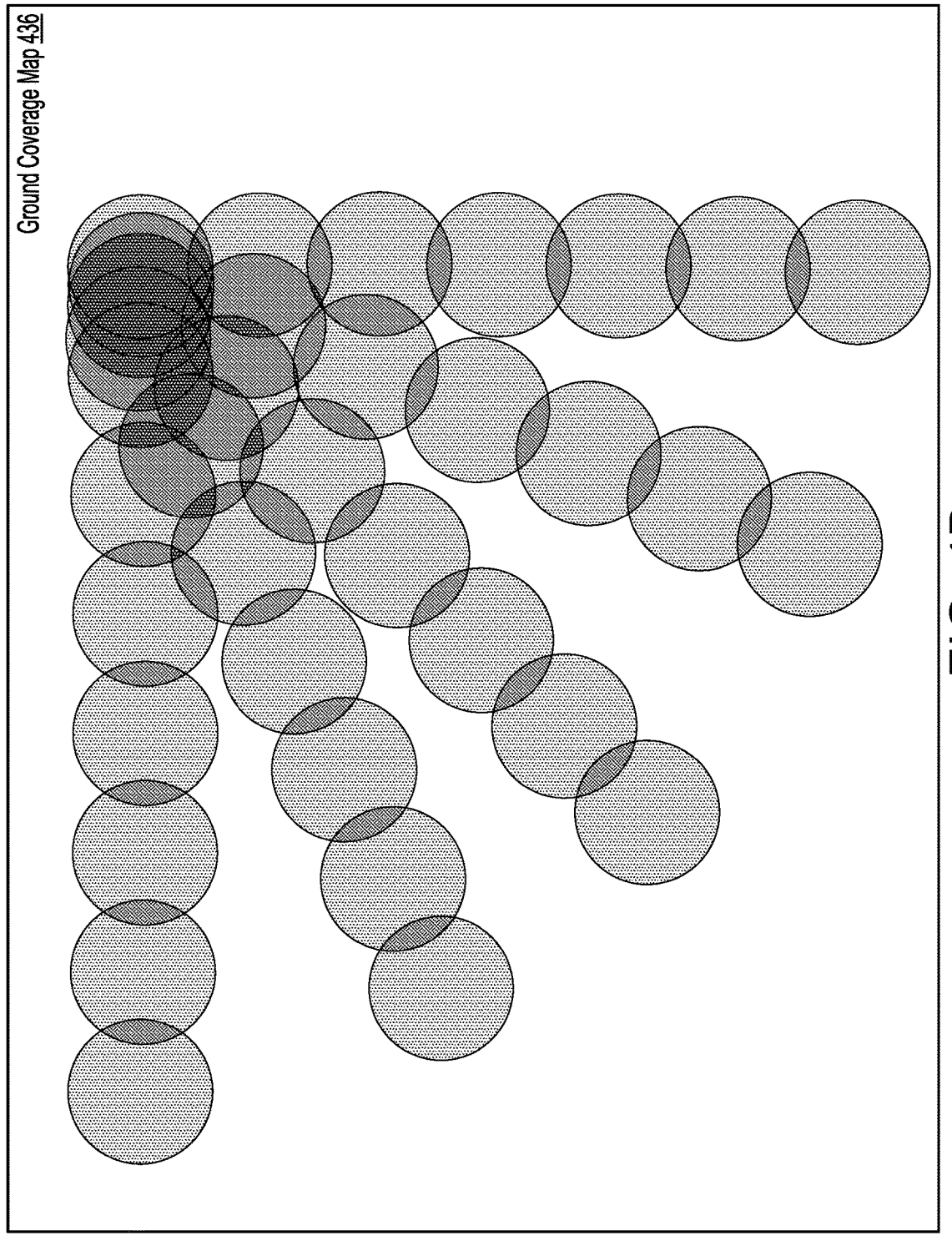

FIGS. 4A and 4B illustrate an example of generating a ground coverage map 436 while a vehicle 450 is operating within a site, in accordance with some embodiments of the present disclosure. In FIG. 4A, while vehicle 450 is making a left turn, a set of five positions are computed using a position sensor and are used to compute a vehicle path 444. At each of the five positions, a set of seven coverage regions 428 are predicted for the seven site modifier devices 422 of vehicle 450. In FIG. 4B, a set of coverage images (not shown) are computed based on coverage regions 428 and are accumulated to generate ground coverage map 436. As shown in ground coverage map 436, overlapping regions between two or more coverage images are darker to indicate combined pixel values from contributing coverage images.

Figure 5:
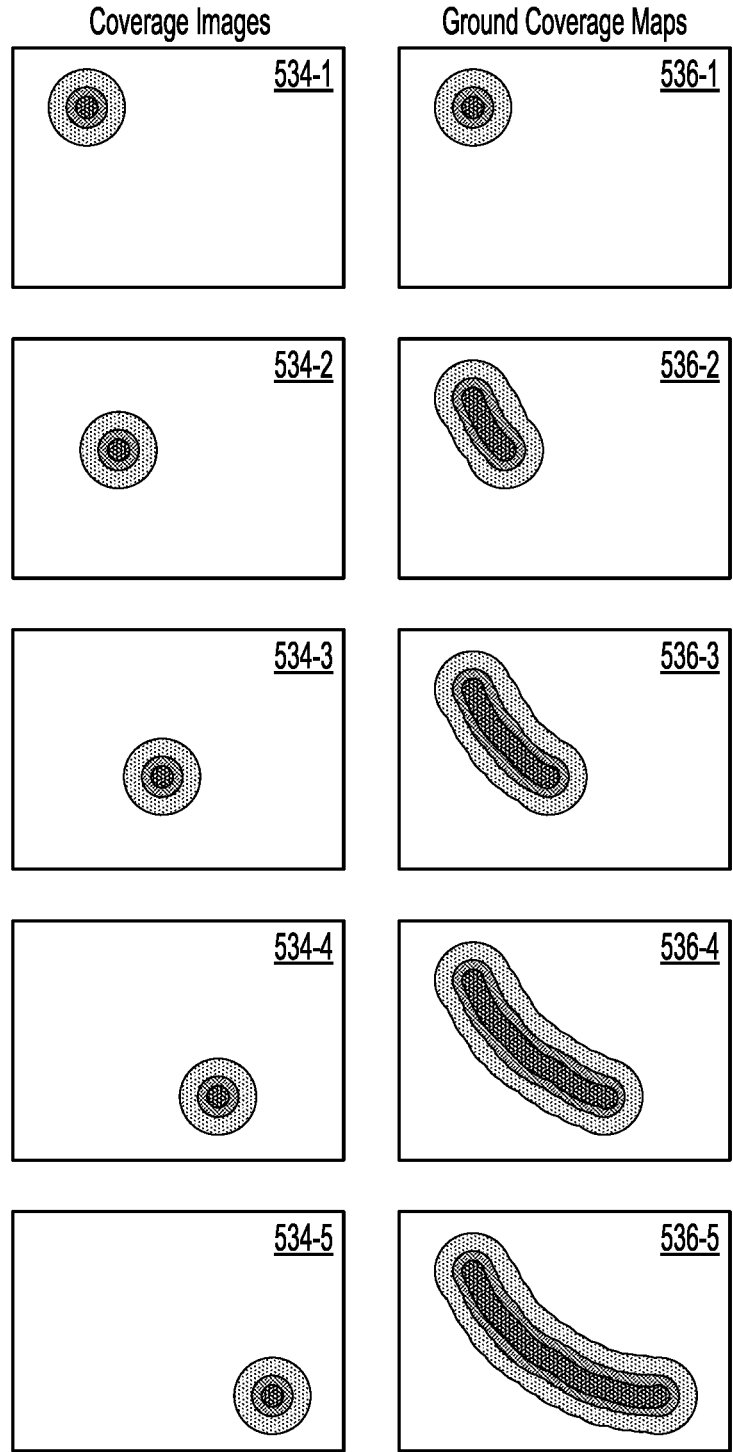
FIG. 5 illustrates an example of generating and updating a ground coverage map while a vehicle is operating within a site.

FIG. 5 illustrates an example of generating and updating a ground coverage map 536 while a vehicle is operating within a site, in accordance with some embodiments of the present disclosure. The example illustrated in FIG. 5 may correspond to the example in FIG. 3 in which the vehicle is making a left turn and, at each of five vehicle positions, a coverage region is predicted for a site modifier device and a coverage image 534 is computed based on the corresponding predicted coverage region. Similar to that described previously, ground coverage map 536 may be generated/updated by accumulating current and previous coverage images 534. For example, ground coverage map 536-2 may be generated by accumulating coverage images 534-1 and 534-2, ground coverage map 536-3 may be generated by accumulating coverage images 534-1, 534-2, and 534-3, and the like.

In some examples (such as the illustrated example), each of coverage images 534 includes regions having one of three separate pixel values based on the magnitude values of the corresponding coverage region. For example, a first magnitude/pixel value may be defined for an inner region of coverage image 534-1, a second magnitude/pixel value (less than the first) may be defined for a first outer region surrounding the inner region, and a third magnitude/pixel value (less than the second) may be defined for a second outer region surrounding the second region.

In some examples (such as the illustrated example), during the aggregation step, different coverage images 534 may be interpolated based on the vehicle path and/or by comparing successive coverage images 534 to determine likely pixel values. For example, as shown in ground coverage map 536-2, coverage images 534-1 and 534-2 may be aggregated by interpolating between similar pixel values, i.e., the inner regions having high pixel values may be connected by a first path also consisting of high pixel values, and the first outer regions surrounding the inner regions may be connected by a second path having the same pixel values (except where the first path lies).

Figure 6:
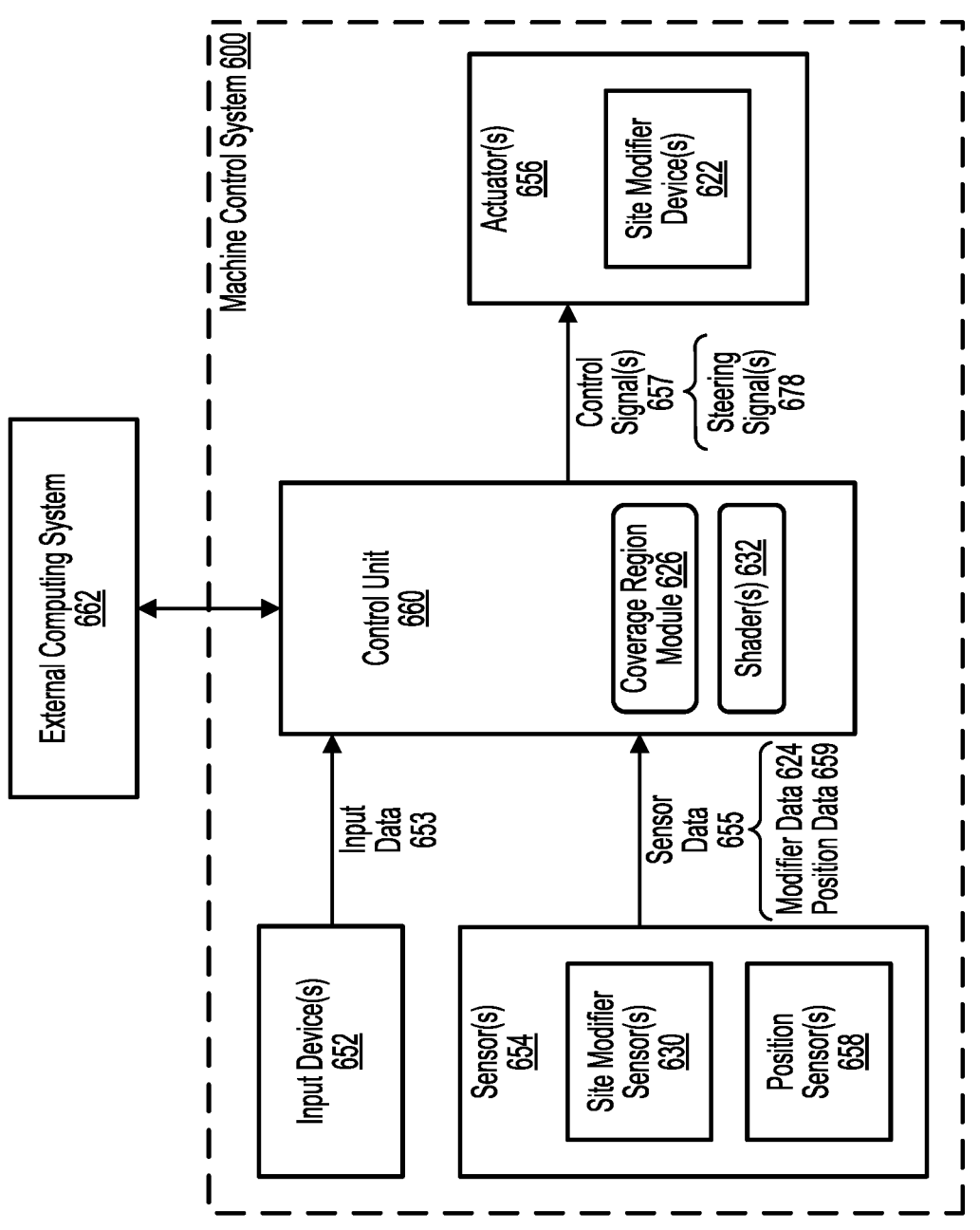
FIG. 6 illustrates an example machine control system.

FIG. 6 illustrates an example machine control system 600, in accordance with some embodiments of the present disclosure. Machine control system 600 may include various input devices 652, sensors 654, actuators 656, and computing devices for allowing one or more operators of the vehicle to complete a work-related task. The components of machine control system 600 may be mounted to or integrated with the components of the vehicle such that the vehicle may be considered to include machine control system 600. The components of machine control system 600 may be communicatively coupled to each other via one or more wired and/or wireless connections.

Machine control system 600 may include a control unit 660 that receives data from the various sensors and inputs and generates commands that are sent to the various actuators and output devices. In the illustrated example, control unit 660 receives input data 653 from input device(s) 652 and sensor data 655 from sensor(s) 654, and generates control signal(s) 657, which are sent to actuator(s) 656. Control unit 660 may include one or more processors (including a CPU and/or a GPU) and an associated memory. In some embodiments, control unit 660 may be communicatively coupled to an external computing system 662 located external to machine control system 600 and the vehicle. External computing system 662 may send instructions to control unit 660 of the details of a work-related task. External computing system 662 may also send alerts and other general information to control unit 660, such as traffic conditions, weather conditions, the locations and status of material transfer vehicles, and the like.

In some embodiments, input device(s) 652 may receive input data 653 that indicates a desired movement of the vehicle, a desired movement of the implement, a desired height of the implement, an activation of one or more mechanisms on the implement (e.g., sprayers, cutters, etc.), and the like. Input device(s) 652 may include a keyboard, a touchscreen, a touchpad, a switch, a lever, a button, a steering wheel, an acceleration pedal, a brake pedal, and the like. In some embodiments, input device(s) 652 may be mounted to any physical part of the vehicle, such as within the cab of the vehicle.

In some embodiments, sensor(s) 654 may include one or more site modifier sensor(s) 630 and/or position sensor(s) 658. Site modifier sensor(s) 630 may monitor site modifier device(s) 622 and present their collected data to control unit 660 in the form of modifier data 624. Position sensor(s) 658 may measure 2D/3D positions (as position data 659) and may comprise a combination of GNSS receivers, which determine position using wireless signals received from satellites, and total stations, which determine position by combining distance, vertical angle, and horizontal angle measurements.

In some examples, sensor(s) 654 may include inertial sensors that detect movement of the components of the vehicle to which they are rigidly attached. For example, inertial sensors may include one or more gyroscopes for detecting angular acceleration, angular rate and/or angular position, one or more accelerometers for detecting linear acceleration, linear velocity, and/or linear position, one or more inertial measurement units (IMUs) which may each include one or more accelerometers, one or more gyroscopes, and/or one or more magnetometers for detecting the above-listed types of data, among other possibilities.

Control unit 660 may include various controllers and modules to assist in the processing of input data 653 and sensor data 655 and the generation of control signal(s) 657. Each of the controllers and modules may include dedicated hardware and/or may be performed using the main processor and/or memory of control unit 660. In some embodiments, control unit 660 includes a coverage region module 626 that predicts coverage regions based on modifier data 624 and/or position data 659. In some embodiments, control unit 660 includes one or more shader(s) 632 that compute coverage images and/or ground coverage maps. The generated ground coverage maps may be used to generate or modify control signal(s) 657, including one or more steering signal(s) 678.

Control signal(s) 657 may include direct current (DC) or alternating current (AC) voltage signals, DC or AC current signals, and/or information-containing signals. In some instances, control signal(s) 657 include a pneumatic or hydraulic pressure. Upon receiving control signal(s) 657, actuator(s) 656 may be caused to move in a specified manner, such as by extending, retracting, rotating, lifting, or lowering by a specified amount. Actuator(s) 656 may use various forms of power to provide movement to the components of the vehicle. For example, actuator(s) 656 may be electric, hydraulic, pneumatic, mechanical, or thermal, among other possibilities.

Figure 7:
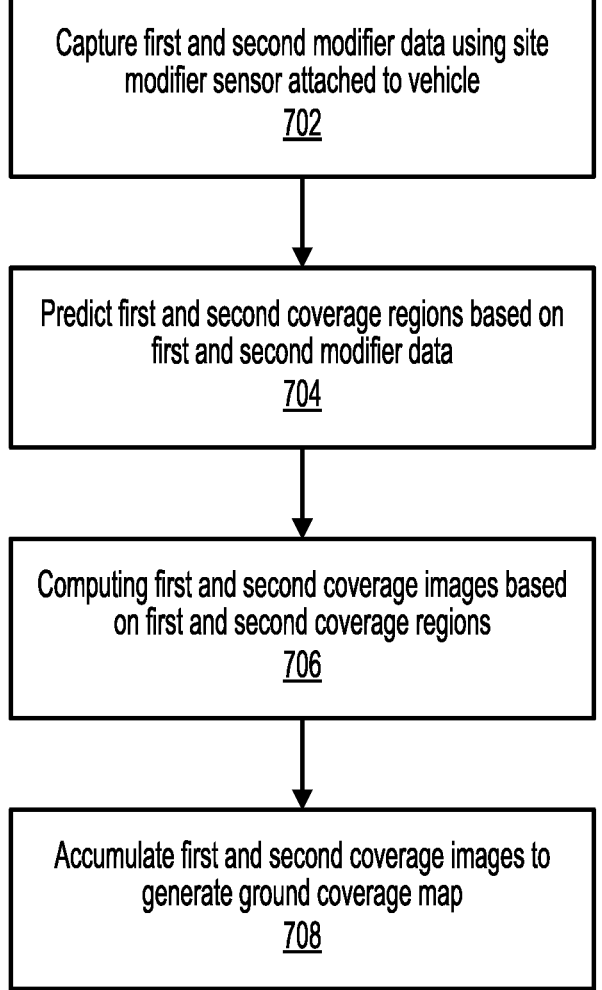
FIG. 7 illustrates a method of generating a ground coverage map that tracks portions of a site that have been modified by a vehicle operating within the site.
Figure 7:
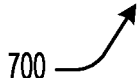

FIG. 7 illustrates a method 700 of generating a ground coverage map (e.g., ground coverage maps 136, 336, 436, 536) that tracks portions of a site (e.g., site 116) that have been modified by a vehicle (e.g., vehicles 150, 250, 350, 450) operating within the site. One or more steps of method 700 may be omitted during performance of method 700, and steps of method 700 need not be performed in the order shown. One or more steps of method 700 may be performed by one or more processors, such as those included in a control unit (e.g., control units 160, 660) of a machine control system (e.g., machine control system 600). Method 700 may be implemented as a computer-readable medium or computer program product comprising instructions which, when the program is executed by one or more computers, cause the one or more computers to carry out the steps of method 700.

At step 702, first and second modifier data (e.g., modifier data 124, 624) are captured using a site modifier sensor (e.g., site modifier sensors 130, 230, 630) attached to the vehicle. The first modifier data may be captured by the site modifier sensor at a first time and the second modifier data may be captured by the site modifier sensor at a second time after the first time. The first modifier data may be indicative of an operation of a site modifier device (e.g., site modifier devices 122, 222, 322, 422, 622) of the vehicle at the first time and the second modifier data may be indicative of an operation of the site modifier device at the second time. In some examples, step 702 may include capturing first and second position data (e.g., position data 159, 659) using a position sensor attached to the vehicle. The first position data may be captured by the position sensor at the first time and the second position data may be captured by the position sensor at the second time.

At step 704, first and second coverage regions (e.g., coverage regions 128, 228, 328, 428) are predicted based on the first and second modifier data. The first coverage region may be predicted based on the first modifier data and the second coverage region may be predicted based on the second modifier data. The first coverage region may correspond to a region within the site that was modified by the site modifier device at the first time and the second coverage region may correspond to a region within the site that was modified by the site modifier device at the second time. In some examples, the first coverage region may be predicted based on the first modifier data and/or the first position data and the second coverage region may be predicted based on the second modifier data and/or the second position data. In some examples, the first and second coverage regions may be predicted at a CPU (e.g., CPU 108) of the control unit.

At step 706, first and second coverage images (e.g., coverage images 334, 534) are computed based on the first and second coverage regions. The first coverage image may be computed based on the first coverage region and the second coverage image may be computed based on the second coverage region. In some examples, the first and second coverage images may be top-down images and/or top-down orthographic images. Each of the first and second coverage images may include a plurality of pixels having pixel values. In some examples, the first and second coverage images may be predicted at a GPU (e.g., GPU 110) of the control unit.

At step 708, the first and second coverage images are accumulated to generate the ground coverage map. Accumulating the first and second coverage images may include summing, averaging, interpolating, or otherwise mathematically combining corresponding pixel values from the first and second coverage images. In some examples, step 708 may further include accumulating a third coverage image with the first and second coverage images to generate/update the ground coverage map. In some examples, step 708 may further include accumulating a fourth coverage image with the first, second, and third coverage images to generate/update the ground coverage map.

In some examples, method 700 may further include utilizing the ground coverage map at the vehicle. For example, method 700 may include displaying the ground coverage map at a display of the vehicle, generating a steering signal to steer the vehicle in a particular direction and/or along a desired vehicle path, analyzing the ground coverage map to generate a desired vehicle path, among other possibilities. Prior to displaying, the ground coverage map may be colorized in accordance with a color-coding legend that translates pixel values into colors.

Figure 8:
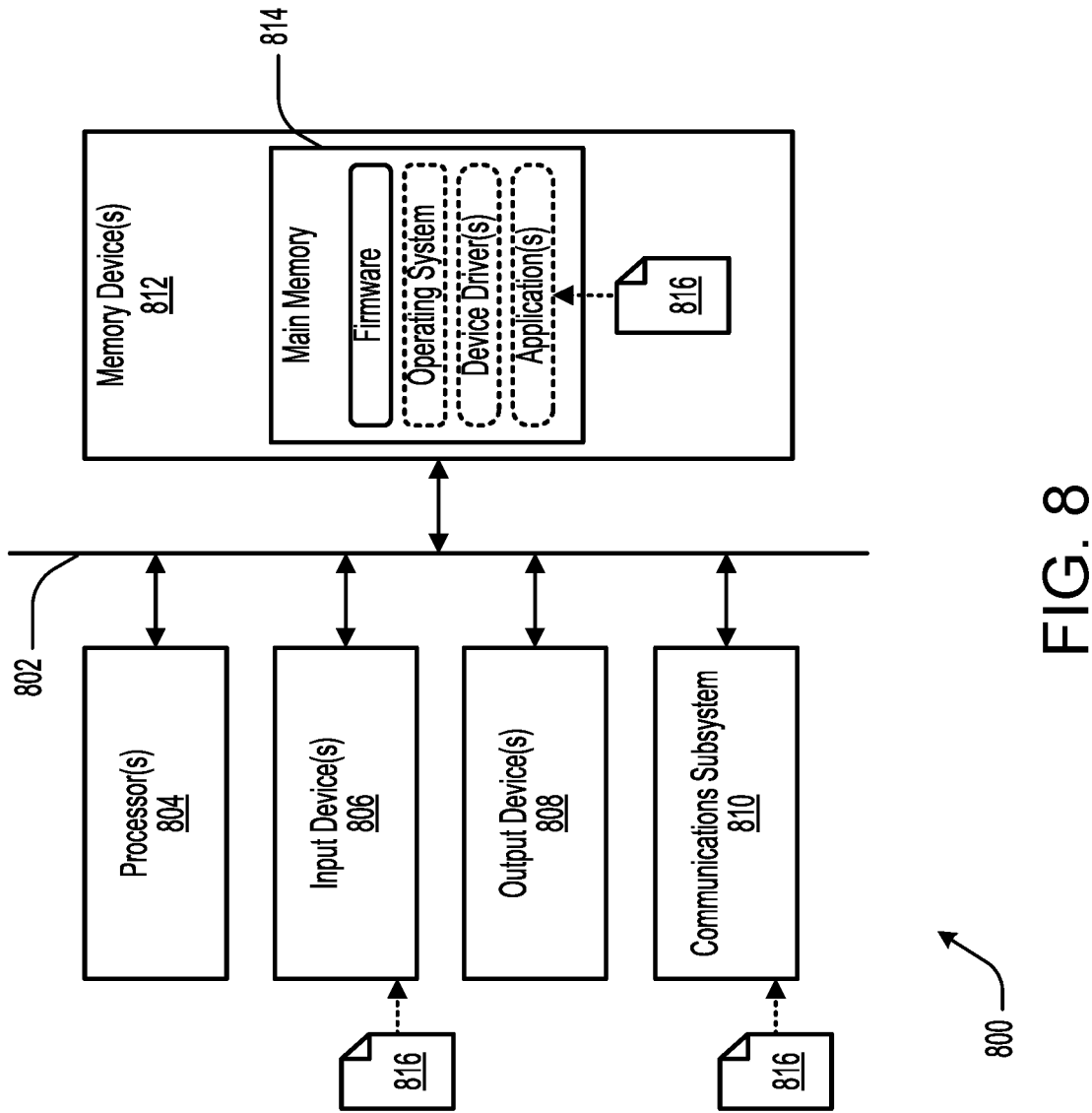
FIG. 8 illustrates an example computer system comprising various hardware elements.

FIG. 8 illustrates an example computer system 800 comprising various hardware elements, in accordance with some embodiments of the present disclosure. Computer system 800 may be incorporated into or integrated with devices described herein and/or may be configured to perform some or all of the steps of the methods provided by various embodiments. For example, in various embodiments, computer system 800 may be incorporated into control units 160, 660 and/or may be configured to perform method 700. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

In the illustrated example, computer system 800 includes a communication medium 802, one or more processor(s) 804, one or more input device(s) 806, one or more output device(s) 808, a communications subsystem 810, and one or more memory device(s) 812. Computer system 800 may be implemented using various hardware implementations and embedded system technologies. For example, one or more elements of computer system 800 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 800 may be coupled via communication medium 802. While communication medium 802 is illustrated as a single connection for purposes of clarity, it should be understood that communication medium 802 may include various numbers and types of communication media for transferring data between hardware elements. For example, communication medium 802 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 802 may include one or more buses connecting pins of the hardware elements of computer system 800. For example, communication medium 802 may include a bus connecting processor(s) 804 with main memory 814, referred to as a system bus, and a bus connecting main memory 814 with input device(s) 806 or output device(s) 808, referred to as an expansion bus. The system bus may consist of several elements, including an address bus, a data bus, and a control bus. The address bus may carry a memory address from processor(s) 804 to the address bus circuitry associated with main memory 814 in order for the data bus to access and carry the data contained at the memory address back to processor(s) 804. The control bus may carry commands from processor(s) 804 and return status signals from main memory 814. Each bus may include multiple wires for carrying multiple bits of information and each bus may support serial or parallel transmission of data.

Processor(s) 804 may include one or more central processing units (CPUs), graphics processing units (GPUs), neural network processors or accelerators, digital signal processors (DSPs), and/or the like. A CPU may take the form of a microprocessor, which is fabricated on a single IC chip of metal-oxide-semiconductor field-effect transistor (MOSFET) construction. Processor(s) 804 may include one or more multi-core processors, in which each core may read and execute program instructions simultaneously with the other cores.

Input device(s) 806 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 806 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 808 may include one or more of various devices that convert information into human-readable form, such as without limitation a display device, a speaker, a printer, and/or the like. Output device(s) 808 may also include devices for writing to removable storage devices or other removable media, such as those described in reference to input device(s) 806. Output device(s) 808 may also include various actuators for causing physical movement of one or more components. Such actuators may be hydraulic, pneumatic, electric, and may be provided with control signals by computer system 800.

Communications subsystem 810 may include hardware components for connecting computer system 800 to systems or devices that are located external computer system 800, such as over a computer network. In various embodiments, communications subsystem 810 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 812 may include the various data storage devices of computer system 800. For example, memory device(s) 812 may include various types of computer memory with various response times and capacities, from faster response times and lower capacity memory, such as processor registers and caches (e.g., L0, L1, L2), to medium response time and medium capacity memory, such as random access memory, to lower response times and lower capacity memory, such as solid state drives and hard drive disks. While processor(s) 804 and memory device(s) 812 are illustrated as being separate elements, it should be understood that processor(s) 804 may include varying levels of on-processor memory, such as processor registers and caches that may be utilized by a single processor or shared between multiple processors.

Memory device(s) 812 may include main memory 814, which may be directly accessible by processor(s) 804 via the memory bus of communication medium 802. For example, processor(s) 804 may continuously read and execute instructions stored in main memory 814. As such, various software elements may be loaded into main memory 814 to be read and executed by processor(s) 804 as illustrated in FIG. 8. Typically, main memory 814 is volatile memory, which loses all data when power is turned off and accordingly needs power to preserve stored data. Main memory 814 may further include a small portion of non-volatile memory containing software (e.g., firmware, such as BIOS) that is used for reading other software stored in memory device(s) 812 into main memory 814. In some embodiments, the volatile memory of main memory 814 is implemented as random-access memory (RAM), such as dynamic RAM (DRAM), and the non-volatile memory of main memory 814 is implemented as read-only memory (ROM), such as flash memory, erasable programmable read-only memory (EPROM), or electrically erasable programmable read-only memory (EEPROM).

Computer system 800 may include software elements, shown as being currently located within main memory 814, which may include an operating system, device driver(s), firmware, compilers, and/or other code, such as one or more application programs, which may include computer programs provided by various embodiments of the present disclosure. Merely by way of example, one or more steps described with respect to any methods discussed above, might be implemented as instructions 816, executable by computer system 800. In one example, such instructions 816 may be received by computer system 800 using communications subsystem 810 (e.g., via a wireless or wired signal carrying instructions 816), carried by communication medium 802 to memory device(s) 812, stored within memory device(s) 812, read into main memory 814, and executed by processor(s) 804 to perform one or more steps of the described methods. In another example, instructions 816 may be received by computer system 800 using input device(s) 806 (e.g., via a reader for removable media), carried by communication medium 802 to memory device(s) 812, stored within memory device(s) 812, read into main memory 814, and executed by processor(s) 804 to perform one or more steps of the described methods.

In some embodiments of the present disclosure, instructions 816 are stored on a computer-readable storage medium, or simply computer-readable medium. Such a computer-readable medium may be non-transitory, and may therefore be referred to as a non-transitory computer-readable medium. In some cases, the non-transitory computer-readable medium may be incorporated within computer system 800. For example, the non-transitory computer-readable medium may be one of memory device(s) 812, as shown in FIG. 8, with instructions 816 being stored within memory device(s) 812. In some cases, the non-transitory computer-readable medium may be separate from computer system 800. In one example, the non-transitory computer-readable medium may a removable media provided to input device(s) 806, such as those described in reference to input device(s) 806, as shown in FIG. 8, with instructions 816 being provided to input device(s) 806. In another example, the non-transitory computer-readable medium may a component of a remote electronic device, such as a mobile phone, that may wirelessly transmit a data signal carrying instructions 816 to computer system 800 using communications subsystem 810, as shown in FIG. 8, with instructions 816 being provided to communications subsystem 810.

Instructions 816 may take any suitable form to be read and/or executed by computer system 800. For example, instructions 816 may be source code (written in a human-readable programming language such as Java, C, C++, C#, Python), object code, assembly language, machine code, microcode, executable code, and/or the like. In one example, instructions 816 are provided to computer system 800 in the form of source code, and a compiler is used to translate instructions 816 from source code to machine code, which may then be read into main memory 814 for execution by processor(s) 804. As another example, instructions 816 are provided to computer system 800 in the form of an executable file with machine code that may immediately be read into main memory 814 for execution by processor(s) 804. In various examples, instructions 816 may be provided to computer system 800 in encrypted or unencrypted form, compressed or uncompressed form, as an installation package or an initialization for a broader software deployment, among other possibilities.

In one aspect of the present disclosure, a system (e.g., computer system 800) is provided to perform methods in accordance with various embodiments of the present disclosure. For example, some embodiments may include a system comprising one or more processors (e.g., processor(s) 804) that are communicatively coupled to a non-transitory computer-readable medium (e.g., memory device(s) 812 or main memory 814). The non-transitory computer-readable medium may have instructions (e.g., instructions 816) stored therein that, when executed by the one or more processors, cause the one or more processors to perform the methods described in the various embodiments.

In another aspect of the present disclosure, a computer-program product that includes instructions (e.g., instructions 816) is provided to perform methods in accordance with various embodiments of the present disclosure. The computer-program product may be tangibly embodied in a non-transitory computer-readable medium (e.g., memory device(s) 812 or main memory 814). The instructions may be configured to cause one or more processors (e.g., processor(s) 804) to perform the methods described in the various embodiments.

In another aspect of the present disclosure, a non-transitory computer-readable medium (e.g., memory device(s) 812 or main memory 814) is provided. The non-transitory computer-readable medium may have instructions (e.g., instructions 816) stored therein that, when executed by one or more processors (e.g., processor(s) 804), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of generating a ground coverage map that indicates portions of a site modified by a vehicle operating within the site, the method comprising:

capturing, using a sensor attached to the vehicle, first and second modifier data indicating sizes and shapes of coverage regions for a site modifier device at first and second times, the sensor being configured to monitor operation of the site modifier device of the vehicle;

predicting, at a central processing unit (CPU), first and second coverage regions based on the first and second modifier data, respectively, the first and second coverage regions corresponding to regions within the site that are modified by the site modifier device at the first and second times, respectively;

computing, at a graphics processing unit (GPU) using one or more graphics shaders, first and second coverage images based on the first and second coverage regions, respectively;

accumulating, at the GPU using the one or more graphics shaders, the first and second coverage images to generate and iteratively update the ground coverage map within a local memory of the GPU, wherein the ground coverage map is updated with subsequent coverage images without transferring the ground coverage map to the CPU; and generating, at the CPU and based on the ground coverage map, a steering signal to guide the vehicle over portions of the site indicated by the ground coverage map as having been insufficiently modified.

2. The method of claim 1, wherein the site modifier device is attached to an implement of the vehicle.

3. The method of claim 1, wherein the site modifier device is one of: a sprayer, a planter, a harvesting tool, or a soil compactor.

4. The method of claim 1, wherein predicting the first and second coverage regions includes:

predicting two-dimensional (2D) or three-dimensional (3D) coordinates defining positions of the first and second coverage regions based on the first and second modifier data, respectively.

5. The method of claim 1, wherein predicting the first and second coverage regions includes:

predicting one or more magnitude values defining an extent to which the site modifier device modified the site within the first and second coverage regions based on the first and second modifier data, respectively.

6. The method of claim 1, wherein the first and second coverage images are top-down images.

7. A system for generating a ground coverage map that indicates portions of a site modified by a vehicle operating within the site, the system comprising:

one or more processors; and a computer-readable medium comprising instructions that, when executed by the one or more processors, cause the one or more processors to perform operations comprising:

capturing, using a sensor attached to the vehicle, first and second modifier data indicating sizes and shapes of coverage regions for a site modifier device at first and second times, the sensor being configured to monitor operation of the site modifier device of the vehicle;

predicting, at a central processing unit (CPU), first and second coverage regions based on the first and second modifier data, respectively, the first and second coverage regions corresponding to regions within the site that are modified by the site modifier device at the first and second times, respectively;

computing, at a graphics processing unit (GPU) using one or more graphics shaders, first and second coverage images based on the first and second coverage regions, respectively;

accumulating, at the GPU using the one or more graphics shaders, the first and second coverage images to generate and iteratively update the ground coverage map within a local memory of the GPU, wherein the ground coverage map is updated with subsequent coverage images without transferring the ground coverage map to the CPU; and generating, at the CPU and based on the ground coverage map, a steering signal to guide the vehicle over portions of the site indicated by the ground coverage map as having been insufficiently modified.

8. The system of claim 7, wherein the site modifier device is attached to an implement of the vehicle.

9. The system of claim 7, wherein the site modifier device is one of: a sprayer, a planter, a harvesting tool, or a soil compactor.

10. The system of claim 7, wherein predicting the first and second coverage regions includes:

predicting two-dimensional (2D) or three-dimensional (3D) coordinates defining positions of the first and second coverage regions based on the first and second modifier data, respectively.

11. The system of claim 7, wherein predicting the first and second coverage regions includes:

predicting one or more magnitude values defining an extent to which the site modifier device modified the site within the first and second coverage regions based on the first and second modifier data, respectively.

12. The system of claim 7, wherein the first and second coverage images are top-down images.

13. A non-transitory computer-readable medium comprising instructions that, when executed by one or more processors, cause the one or more processors to perform operations for generating a ground coverage map that indicates portions of a site modified by a vehicle operating within the site, the operations comprising:

receiving first and second modifier data indicating sizes and shapes of coverage regions for a site modifier device at first and second times, the first and second modifier data having been captured using a sensor attached to the vehicle, the sensor being configured to monitor operation of the site modifier device of the vehicle;

predicting, at a central processing unit (CPU), first and second coverage regions based on the first and second modifier data, respectively, the first and second coverage regions corresponding to regions within the site that are modified by the site modifier device at the first and second times, respectively;

computing, at a graphics processing unit (GPU) using one or more graphics shaders, first and second coverage images based on the first and second coverage regions, respectively;

accumulating, at the GPU using the one or more graphics shaders, the first and second coverage images to generate and iteratively update the ground coverage map within a local memory of the GPU, wherein the ground coverage map is updated with subsequent coverage images without transferring the ground coverage map to the CPU; and generating, at the CPU and based on the ground coverage map, a steering signal to guide the vehicle over portions of the site indicated by the ground coverage map as having been insufficiently modified.

14. The non-transitory computer-readable medium of claim 13, wherein the site modifier device is one of: a sprayer, a planter, a harvesting tool, or a soil compactor.

15. The non-transitory computer-readable medium of claim 13, wherein predicting the first and second coverage regions includes:

predicting two-dimensional (2D) or three-dimensional (3D) coordinates defining positions of the first and second coverage regions based on the first and second modifier data, respectively.

16. The non-transitory computer-readable medium of claim 13, wherein predicting the first and second coverage regions includes:

predicting one or more magnitude values defining an extent to which the site modifier device modified the site within the first and second coverage regions based on the first and second modifier data, respectively.

17. The non-transitory computer-readable medium of claim 13, wherein the first and second coverage images are top-down images.

* * * * *